(12) United States Patent
Kume et al.

(10) Patent No.: US 8,697,298 B2
(45) Date of Patent: Apr. 15, 2014

(54) FUEL CELL SYSTEM WITH HEATER

(75) Inventors: Koji Kume, Kariya (JP); Akishi Morita, Aichi-ken (JP); Yasunari Arai, Takahama (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 1236 days.

(21) Appl. No.: 12/503,349

(22) Filed: Jul. 15, 2009

(65) Prior Publication Data
US 2010/0028740 A1  Feb. 4, 2010

(30) Foreign Application Priority Data
Aug. 1, 2008  (JP) ................................. 2008-200146

(51) Int. Cl.
*H01M 8/06* (2006.01)

(52) U.S. Cl.
USPC ........................................................ 429/414

(58) Field of Classification Search
USPC ................ 429/9, 414, 432, 444, 448, 24, 415
See application file for complete search history.

(56) References Cited

U.S. PATENT DOCUMENTS

2002/0058168 A1* 5/2002 Voss et al. ........................ 429/13

FOREIGN PATENT DOCUMENTS

| EP | 1724782 | 11/2006 |
|----|---------|---------|
| JP | 9-293526 | 11/1997 |
| JP | 2001-216981 | 8/2001 |
| JP | 2002-298884 | 10/2002 |
| JP | 2004-207022 | 7/2004 |
| JP | 2005-257093 | 9/2005 |
| JP | 3725387 | 9/2005 |
| JP | 2006-177537 | 7/2006 |
| JP | 2008-41388 | 2/2008 |
| WO | WO96/20509 | * 7/1996 |

OTHER PUBLICATIONS

JP 2008-041388(machine translation).*
JP 2004-207022 to Nishitsuru machine translation.*
English language Abstract of JP 2001-216981, Aug. 10, 2001.
English language Abstract of JP 3725387, Sep. 30, 2005.
English language Abstract of JP 2002-298884, Oct. 11, 2002.
English language Abstract of JP 2008-41388, Feb. 21, 2008.

* cited by examiner

*Primary Examiner* — Patrick Ryan
*Assistant Examiner* — Alex Usyatinsky
(74) *Attorney, Agent, or Firm* — Greenblum & Bernstein, P.L.C.

(57) ABSTRACT

A first rectangular pipe is connected along a path of an oxidation gas supply pipe that supplies an oxidation gas from a pump to an oxidant pole of a fuel cell. A second rectangular pipe is connected to an oxidation off-gas pipe connected to an outlet of the oxidant pole. A lower surface of the first rectangular pipe is contacted with an upper surface of the second rectangular pipe. A connecting path is provided to the contact surface, and a vapor permeable membrane is disposed at the connecting path. An upper surface of a third rectangular pipe is provided in surface contact with a lower surface of the second rectangular pipe, the third rectangular pipe being provided to a coolant out-pipe connected to a cooling jacket of the fuel cell. Generated water in the second pipe is heated and evaporated by a coolant heated in the third rectangular pipe. The water vapor then permeates the vapor permeable membrane, and is directed inside the first rectangular pipe so as to humidify the oxidation gas.

4 Claims, 5 Drawing Sheets

25: Oxidation gas pipe
26: Oxidation off-gas pipe
32: Coolant circulation pipe
32a: Coolant in-pipe
32b: Coolant out-pipe
37, 40, 43, 45: Rectangular pipe
41: Connecting path
42: Vapor permeable membrane
44: Heater
46: Cooler

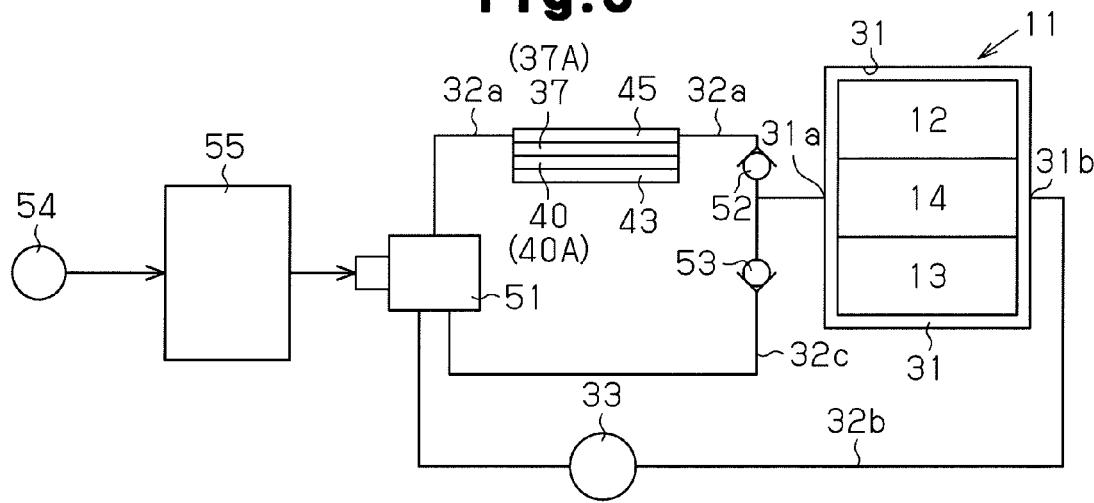
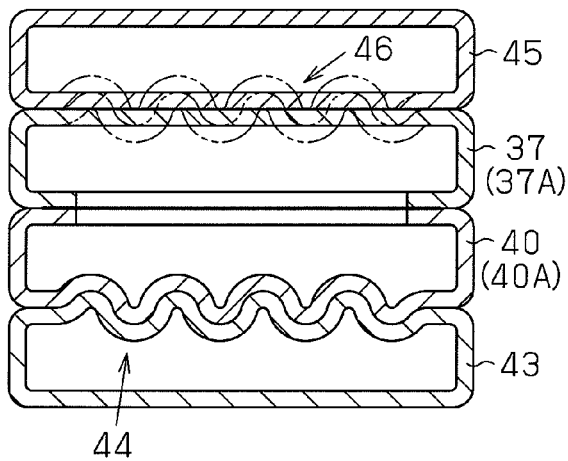
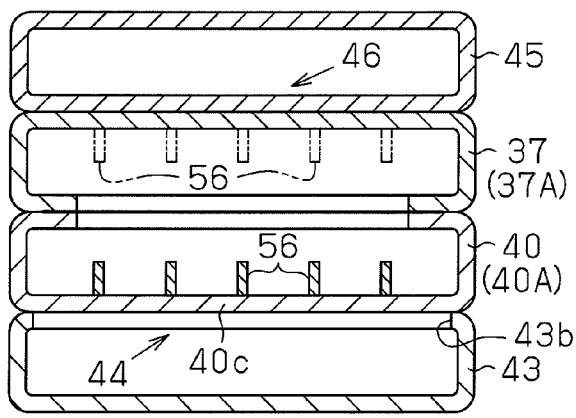
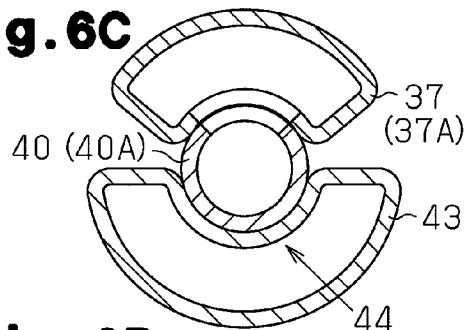
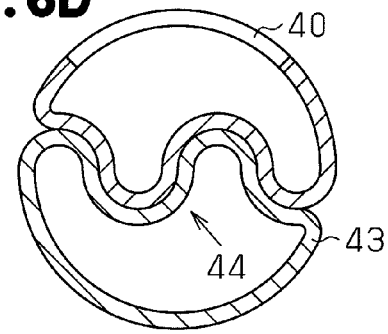
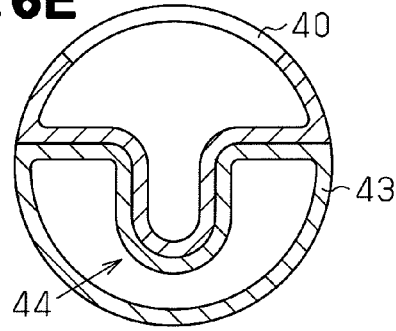

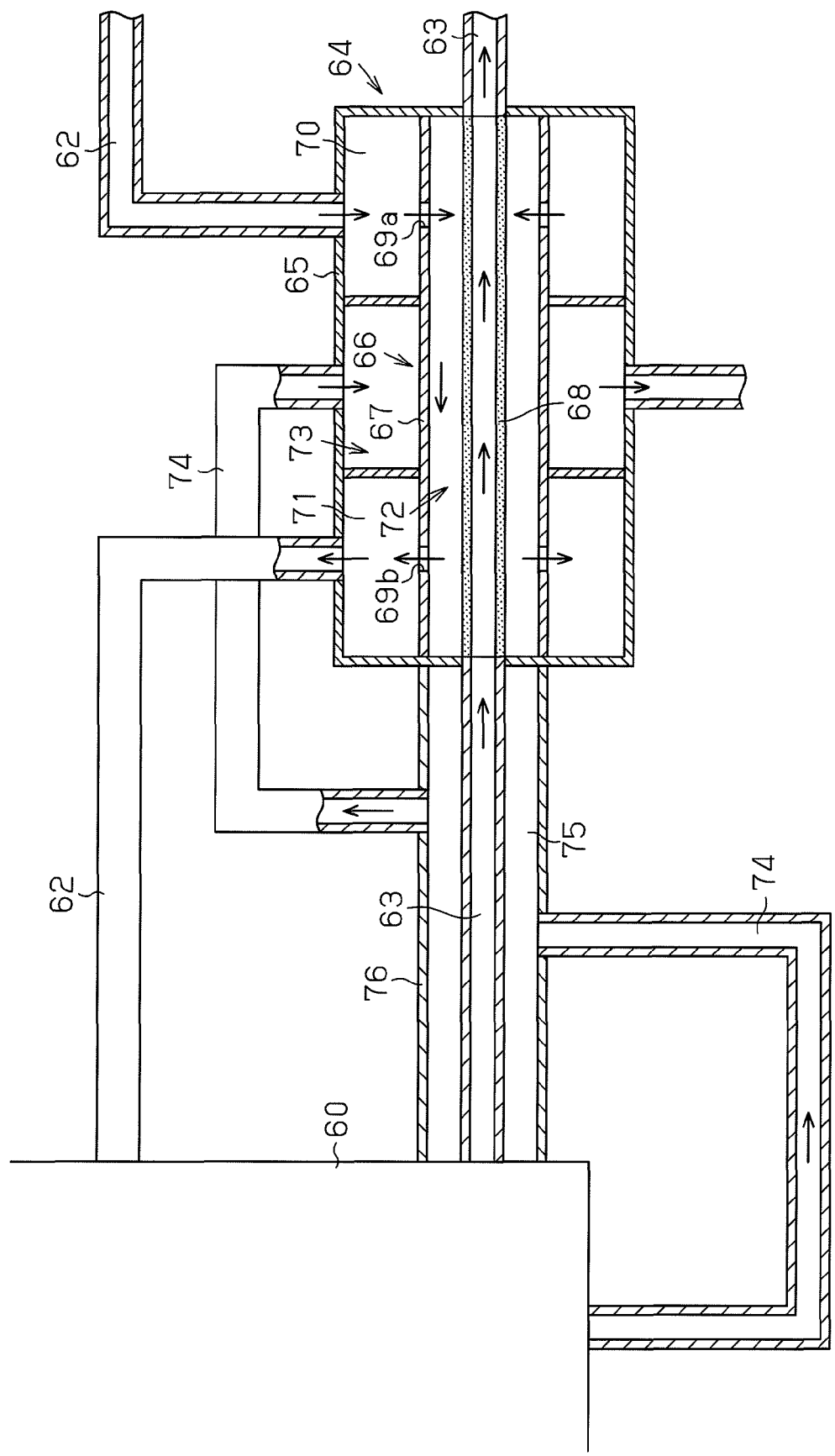

FUEL CELL SYSTEM WITH HEATER

CROSS-REFERENCE TO RELATED APPLICATIONS

The present application claims priority under 35 U.S.C. §119 of Japanese Application No. 2008-200146 filed on Aug. 1, 2008, the disclosure of which is expressly incorporated by reference herein in its entirety.

BACKGROUND OF THE INVENTION

1. Field of the Invention

The present invention relates to a fuel cell system, more specifically to a humidifying structure that humidifies a fuel gas or an oxidation gas, the fuel gas being supplied to a fuel pole of a fuel cell, the oxidation gas being supplied to an oxidant pole thereof

2. Description of Related Art

As eco-friendly electric vehicles, vehicles have recently been developed in which a solid polymer type fuel cell system is mounted. A fuel cell used for the above-described fuel cell system has a plurality of power generation cells in the stack. Each of the power generation cells includes a solid polymer electrolyte membrane having hydrogen ion conductivity, on whose both surfaces anode and cathode carbon electrodes respectively supporting a platinum catalyst are stacked. Gas path forming members formed of lathe-cut metal are respectively stacked on surfaces of the both carbon electrodes, so as to supply a reaction gas thereto. Planar separators are respectively stacked on surfaces of the both gas path forming members.

A hydrogen gas is supplied to the anode electrode as a fuel gas, and air (oxygen gas) is supplied to the cathode electrode as an oxidation gas. The hydrogen gas is ionized on the anode electrode side and transferred to the cathode electrode as the gas permeates the solid polymer electrolyte membrane. On the cathode electrode side, the hydrogen ions react with oxygen and thus generate water. A portion of the generated water permeates the solid polymer electrolyte membrane from the cathode electrode side and flows to the anode electrode side as percolating water. Electrons of the anode electrode are transferred to the cathode electrode through external load. A series of the above-described electrochemical reactions produce electric energy.

In the fuel cell, when the solid polymer electrolyte membrane is dried, permeability of hydrogen ions is lowered. Accordingly, energy conversion efficiency, or power generation efficiency, is lowered. In order to prevent the solid polymer electrolyte membrane from being dried, moisture should be supplied thereto. For this purpose, a unit-type humidifying apparatus is provided to maintain power generation efficiency by humidifying supplied gases, including the fuel gas and the oxidation gas, and thus supplying moisture to the electrolyte membrane.

Related Art 1 discloses a fuel cell humidifying apparatus of the type above. The humidifying apparatus is explained below with reference to FIGS. 7 and 8. Air, which is pressured by a super charger 61, is supplied as an oxidation gas, to an inlet on an oxidant pole side of a fuel cell 60 through an oxidation gas pipe 62. After being used as an oxidant in the fuel cell 60, the air (oxygen) is discharged as an oxidation off-gas along with generated water, from an outlet on the oxidant pole side through an oxidation off-gas pipe 63. A unit-type humidifying apparatus 64, which humidifies the oxidation gas, is connected along the path of the oxidation gas pipe 62 and the oxidation off-gas pipe 63.

The humidifying apparatus 64 has a humidifier 66 in a housing 65, as shown in FIG. 8. The humidifier 66 includes a laterally cylindrical casing 67 and a plurality of hollow fibers 68 (only one of them is illustrated as a thick fiber in the drawing), which are housed in parallel in the casing 67. The oxidation off-gas pipe 63 is connected to both openings of each of the hollow fibers 68. The casing 67 is provided with two openings 69a and 69b. The housing 65 is provided with a compartmented hollow portion 70 corresponding to the opening 69a, and a compartmented hollow portion 71 corresponding to the opening 69b. The oxidation gas pipe 62 is connected to the hollow portions 70 and 71. An oxidation gas path 72 is provided between an internal periphery surface of the casing 67 and an external periphery surface of each of the hollow fibers 68, the oxidation gas path 72 connecting the hollow portions 70 and 71 through the openings 69a and 69b, respectively.

Further, a heating chamber 73 is provided in a middle portion of the housing 65, the heating chamber 73 heating the casing 67 of the humidifier 66. A coolant circulation pipe 74 is connected to the heating chamber 73, the coolant circulation pipe 74 cooling inside the fuel cell 60. A casing 76, which forms a heating chamber 75, is provided in a vicinity of an external periphery of the oxidation off-gas pipe 63 from the fuel cell 60 to the housing 65. The coolant circulation pipe 74 connected to the fuel cell 60 is also connected to the heating chamber 75. Thereby, a coolant, which is heated to a temperature of 120° C., for instance, after having cooled the fuel cell 60, is first directed to the heating chamber 75, in which the coolant heats the oxidation off-gas and generated water flowing in the oxidation off-gas pipe 63. Thereafter, the coolant is supplied from the coolant circulation pipe 74 to the heating chamber 73. The heated coolant heats the path 72 inside the casing 67 of the humidifier 66, and then the heated oxidation gas in the path 72 heats the hollow fiber 68. Further, the generated water flowing in the hollow fiber 68 is heated, and thus evaporated. The water vapor permeates the hollow fiber 68 and is transferred to the path 72. The oxidation gas in the path 72 is humidified by the water vapor, and the humidified oxidation gas is supplied to the fuel cell 60 through the oxidation gas pipe 62.

[Related Art 1] Japanese Patent Laid-open Publication No. 2001-216981

The conventional humidifying apparatus 64 is capable of heating and evaporating the generated water in the hollow fiber 68, by using the heated coolant used for cooling the fuel cell 60 during power generation. Thus, the humidifying apparatus 64 has an advantage requiring no device exclusively for heating. The humidifying apparatus 64, however, has problems as described below. Specifically, the humidifying apparatus 64 has a structure in which the humidifier 66 is housed in the housing 65; the hollow portions 70 and 71 and the heating chamber 73 are provided in the housing 65; the openings 69a and 69b are provided to the casing 67 of the humidifier 66; the oxidation gas path 72 is provided in the casing 67; and the casing 76 is provided to form the heating chamber 75. Consequently, the structure of the humidifying apparatus as a whole is very complex, thus increasing the number of parts, making manufacturing and assembly operations difficult, and preventing reduction in facility cost.

The conventional humidifying apparatus is provided with the heating chamber 73 on the external periphery side of the casing 67, and the path 72 between the internal periphery surface of the casing 67 and the external periphery surface of the hollow fiber 68. Thus, the heated coolant in the heating chamber 73 indirectly heats the water inside the hollow fiber 68. Without the heating chamber 75, the efficiency is lowered in heating and evaporating the generated water in the hollow fiber 68, and thus humidification cannot be performed appropriately.

SUMMARY OF THE INVENTION

The embodiments of the present invention are provided to address the problems with the conventional technology above. An advantage of the embodiments of the present invention is to provide a fuel cell system capable of reducing facility cost for humidifying a gas supplied to a fuel pole or an oxidant pole of a fuel cell, and of appropriately humidifying the supplied gas.

In order to address the problems above, one aspect of the present embodiments provides a fuel cell system including a fuel cell having a fuel pole and an oxidant pole; a fuel gas pipe configured to supply a fuel gas and connected to an inlet of the fuel pole; a fuel off-gas pipe connected to an outlet of the fuel pole; an oxidation gas pipe configured to supply an oxidation gas and connected to an inlet of the oxidant pole; an oxidation off-gas pipe connected to an outlet of the oxidant pole; a coolant circulation pipe configured to circulate a coolant and connected to an inlet and an outlet of a cooling jacket in the fuel cell; and a heat exchanger configured to cool the coolant heated in the fuel cell and provided to the coolant circulation pipe. In the fuel cell system, opposing openings are provided to respective pipe walls of the oxidation gas pipe and the oxidation off-gas pipe; a connecting hole is formed by the openings; a vapor permeable membrane is disposed at the connecting hole; and an external periphery surface of a coolant out-pipe provided from the outlet of the cooling jacket to the heat exchanger is provided in surface contact with an external periphery surface of the oxidation off-gas pipe, such that a heater is provided in which heat of the heated coolant in the coolant out-pipe is utilized to heat water in the oxidation off-gas pipe and thus produce water vapor.

In a further aspect of the fuel cell system, opposing openings are provided to respective pipe walls of the fuel gas pipe and the fuel off-gas pipe; a connecting hole is formed by the openings; a vapor permeable membrane is disposed at the connecting hole; and the external periphery surface of the coolant out-pipe provided from the outlet of the cooling jacket to the heat exchanger is provided in surface contact with an external periphery surface of the fuel off-gas pipe, such that a heater is provided in which heat of the heated coolant in the coolant out-pipe is utilized to heat water in the fuel off-gas pipe and thus produce water vapor.

In a further aspect of the fuel cell system, the pipe wall of the oxidation gas pipe corresponding to the vapor permeable membrane is provided in surface contact with a pipe wall of a coolant in-pipe provided from the heat exchanger to the inlet of the cooling jacket, such that a cooler is provided in which an oxidation gas in the oxidation gas pipe is cooled.

In a further aspect of the fuel cell system, a coolant bypass pipe is provided in parallel with the coolant in-pipe, such that the cooler is circumvented; a switching valve for a coolant flow is provided to a connecting portion of an upstream portion of the coolant bypass pipe and the coolant in-pipe; and a temperature sensor is provided to measure an internal temperature of the oxidation gas pipe. When a value measured by the temperature sensor exceeds a reference value, a switching signal is output from a controller to the switching valve, such that the coolant flow is switched from the bypass pipe to the coolant in-pipe of the cooler.

In a further aspect of the fuel cell system, the pipe wall of the fuel gas pipe corresponding to the vapor permeable membrane is provided in surface contact with a pipe wall of a coolant in-pipe provided from the heat exchanger to the inlet of the cooling jacket, such that a cooler is provided in which the fuel gas in the fuel gas pipe is cooled.

In a further aspect of the fuel cell system, a coolant bypass pipe is provided in parallel with the coolant in-pipe, such that the cooler is circumvented; a switching valve for a coolant flow is provided to a connecting portion of an upstream portion of the coolant bypass pipe and the coolant in-pipe; and a temperature sensor is provided to measure an internal temperature of the fuel gas pipe. When a value measured by the temperature sensor exceeds a reference value, a switching signal is output from a controller to the switching valve, such that the coolant flow is switched from the bypass pipe to the coolant in-pipe of the cooler.

In a further aspect of the fuel cell system, the surface contact portion of the pipes has a serpentine shape. In a further aspect of the fuel cell system, the surface contact portion of the pipes is provided with a thin portion configured to facilitate heat conductance.

Another aspect of the present embodiments provides a fuel cell system including a fuel cell having a fuel pole and an oxidant pole; a fuel gas pipe configured to supply a fuel gas and connected to an inlet of the fuel pole; a fuel off-gas pipe connected to an outlet of the fuel pole; an oxidation gas pipe configured to supply an oxidation gas and connected to an inlet of the oxidant pole; an oxidation off-gas pipe connected to an outlet of the oxidant pole; a coolant circulation pipe configured to circulate a coolant and connected to an inlet and an outlet of a cooling jacket in the fuel cell; and a heat exchanger configured to cool the coolant heated in the fuel cell and provided to the coolant circulation pipe. In the fuel cell system, opposing openings are provided to respective pipe walls of the fuel gas pipe and the fuel off-gas pipe; a connecting hole is formed by the openings; a vapor permeable membrane is disposed at the connecting hole; and an external periphery surface of a coolant out-pipe provided from the outlet of the cooling jacket to the heat exchanger is provided in surface contact with an external periphery surface of the fuel off-gas pipe, such that a heater is provided in which heat of the heated coolant in the coolant out-pipe is utilized to heat water in the fuel off-gas pipe and thus produce water vapor.

According to the aspects of the present embodiments, the heat of the heated coolant in the coolant out-pipe is efficiently transferred to the water in the oxidation off-gas pipe through the heater (surface contact portion) of the coolant out-pipe and the oxidation off-gas pipe, and thus water vapor is produced. The water vapor permeates the vapor permeable membrane and flows into the oxidation gas pipe. Thereby, the oxidation gas is appropriately humidified.

The aspects of the present embodiments can provide a simplified humidifying structure, in which the openings are provided to the oxidation gas pipe and the oxidation off-gas pipe; the connecting hole is formed by the openings; and the vapor permeable membrane is disposed at the connecting hole. Further, the heater has a structure in which the external periphery surface of the oxidation off-gas pipe is provided in surface contact with the external periphery surface of the coolant out-pipe. Thereby, an exclusive heater can be eliminated, and the structure of the heater can be simplified.

The present embodiments can reduce facility cost for humidifying a gas supplied to the fuel pole or the oxidant pole of the fuel cell, as well as appropriately humidify the supplied gas.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 5 is a schematic circuit diagram illustrating a fuel cell system according to an alternative embodiment of the present invention;

FIGS. 6A to 6E are lateral cross-sectional views illustrating a fuel cell system according to alternative embodiments of the present invention;

FIG. 8 is an enlarged longitudinal cross-sectional view illustrating a humidifying apparatus of the conventional fuel cell system.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
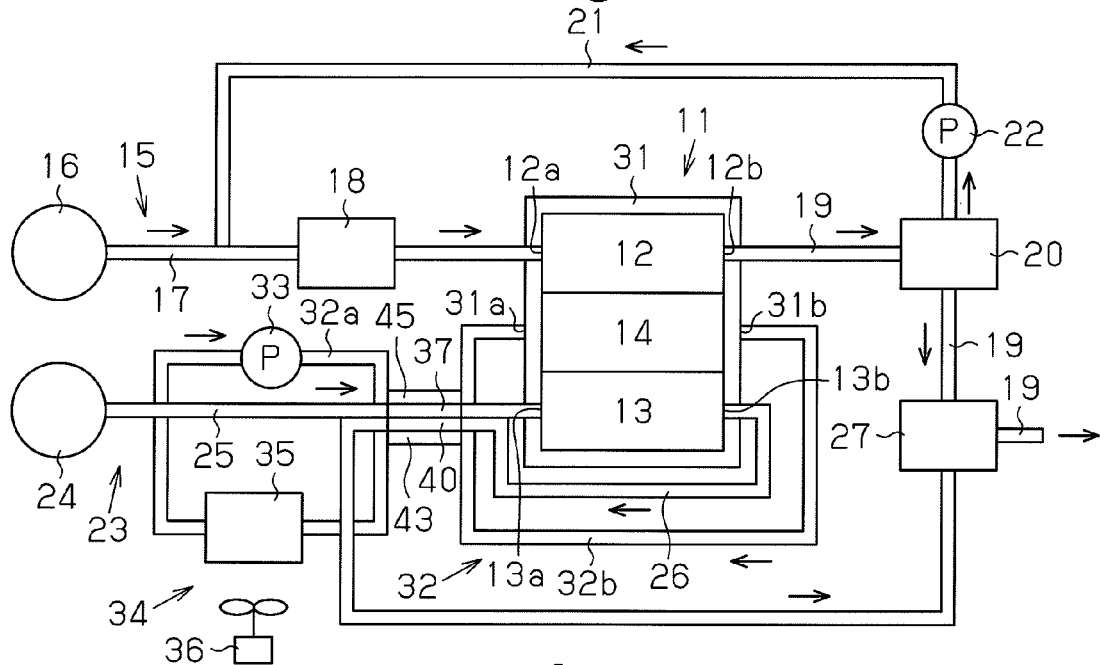
FIG. 1 is a schematic circuit diagram illustrating a fuel cell system according to an embodiment of the present invention.

An embodiment of a fuel cell system according to the present invention is explained below with reference to FIGS. 1 to 3. A fuel cell 11, as shown in FIG. 1, is internally provided with a plurality of pieces of power generation cells. Each of the power generation cells includes a fuel pole 12, an oxidant pole 13, a solid electrolyte membrane 14 provided between the both poles 12 and 13, and the like. FIG. 1 schematically illustrates only one power generation cell. A hydrogen gas supplier 15, which supplies a hydrogen gas as a fuel, is connected to an inlet 12a of the fuel pole 12. An air supplier 23, which supplies air containing an oxygen gas as an oxidation gas, is connected to an inlet 13a of the oxidant pole 13. Then, the hydrogen gas and oxygen gas supplied to each of the power generation cells in the fuel cell 11 chemically react with each other, and thus generate power.

The hydrogen gas supplier 15 supplies a humidified hydrogen gas from a hydrogen gas cylinder 16, which supplies a high-pressure hydrogen gas, to the fuel pole 12 through a fuel gas pipe 17 and a conventionally known humidifier 18. A fuel off-gas pipe 19 is connected to an outlet 12b of the fuel pole 12. The fuel off-gas pipe 19 discharges to outside, fuel off-gases not used for cell reaction, including a hydrogen gas and a nitrogen gas. A hydrogen separator 20, which separates a hydrogen gas contained in the fuel off-gases, is connected to the fuel off-gas pipe 19. The hydrogen gas separated by the hydrogen separator 20 is returned to the fuel gas pipe 17 on an upstream side of the humidifier 18, by a hydrogen gas circulation pipe 21 and a pump 22 connected to the pipe 21.

The air supplier 23 includes a pump 24 and an oxidation gas pipe 25. The pump 24 compresses and supplies air. The oxidation gas pipe 25 supplies the air supplied by the pump 24 to the inlet 13a of the oxidant pole 13. An oxidation off-gas pipe 26 is connected to an outlet 13b of the oxidant pole 13. The fuel off-gas pipe 26 discharges to outside, an oxygen gas not used for cell reaction as an oxidation off-gas. A hydrogen attenuator 27 is connected to the fuel off-gas pipe 19 on a downstream side of the hydrogen separator 20. The oxidation off-gas pipe 26 is connected to the hydrogen attenuator 27. A hydrogen gas not separated by the hydrogen separator 20 is directed inside the hydrogen attenuator 27. The hydrogen gas is then attenuated by the oxidation off-gas, which is supplied into the hydrogen attenuator 27 from the oxidation off-gas pipe 26, and discharged to air from the fuel off-gas pipe 19.

A cooling circuit is explained below. The cooling circuit cools the power generation cells of the fuel cell 11 when the fuel cell 11 is operating, in order to allow appropriate power generation. A cooling jacket 31 is provided inside the fuel cell 11, so as to cover the stacked power generation cell. A coolant circulation pipe 32, which circulates a coolant, is connected to an inlet 31a and an outlet 31b of the cooling jacket 31. A pump 33 is connected to the coolant circulation pipe 32. In the present embodiment, an LLC (long life coolant) containing ethylene glycol in water is used as a coolant. A heat exchanger 34 is connected to the coolant circulation pipe 32 on an upstream side of the pump 33. The heat exchanger 34 cools a coolant to a temperature of 20° C. to 30° C., for example, the coolant being heated to a temperature of 100° C. to 120° C., for example, after having cooled the fuel cell 11. The heat exchanger 34 includes a radiator 35 and a fan 36. The radiator 35 is connected to the coolant circulation pipe 32. The fan 36 is provided to cool the coolant by blowing air to the radiator 35.

In the present embodiment, a portion of the coolant circulation pipe 32 from the heat exchanger 34 to the inlet 31a of the cooling jacket 31 is referred to as a coolant in-pipe 32a. A portion of the coolant circulation pipe 32 from the outlet 31b of the cooling jacket 31 to the heat exchanger 34 is referred to as a coolant out-pipe 32b.

A main portion of the structure according to the present embodiment is explained below. A most portion of the oxidation gas pipe 25 is a cylindrical pipe. A rectangular pipe 37 having a flat rectangular cylindrical shape is connected in series in a middle portion closer to the inlet 13a of the oxidant pole 13, as shown in FIGS. 2 and 3. Both end openings of the rectangular pipe 37 are closed by lid plates 38. Boss portions 39 are provided to the both lid plates 38 in order to connect the oxidation gas pipe 25.

A most portion of the oxidation off-gas pipe 26, which is provided from the outlet 13b of the oxidant pole 13 to the hydrogen attenuator 27, is also a cylindrical pipe. A rectangular pipe 40 having a flat rectangular cylindrical shape is connected in series in a middle portion of the oxidation off-gas pipe 26, as shown in FIGS. 2 and 3. Both end openings of the rectangular pipe 40 are closed by the lid plates 38. The boss portions 39 are provided to the both lid plates 38 in order to connect the oxidation off-gas pipe 26. An upper surface of an upper plate 40a of the rectangular pipe 40 is in surface contact with a lower surface of a bottom plate 37a of the rectangular pipe 37. An opening 37b having a rectangular shape from a plain view is provided to the bottom plate 37a of the rectangular pipe 37. An opening 40b having a same shape as the opening 37b is provided to the upper plate 40a of the rectangular pipe 40. A connecting path 41 is thus formed by the both openings 37b and 40b, the connecting path 41 internally connecting the rectangular pipe 37 and the rectangular pipe 40. A vapor permeable membrane 42 is disposed at the connecting path 41. An external periphery of the vapor permeable membrane 42 is sandwiched between the bottom plate 37a of the rectangular pipe 37 and the upper plate 40a of the rectangular pipe 40.

A most portion of the coolant out-pipe 32b, which is provided from the outlet 31b of the coolant jacket 31 to the radiator 35, is also a cylindrical pipe. A rectangular pipe 43 having a flat rectangular cylindrical shape is connected in series in a middle portion of the coolant out-pipe 32b, as shown in FIGS. 2 and 3. Both end openings of the rectangular pipe 43 are closed by the lid plates 38. The boss portions 39 are provided to the both lid plates 38 in order to connect the coolant out-pipe 32b. An upper surface of an upper plate 43a of the rectangular pipe 43 is in surface contact with a lower surface of a bottom plate 40c of the rectangular pipe 40.

In the present embodiment, a heater 44 is provided by the surface contact portion of the rectangular pipe 40 and the rectangular pipe 43. The heater 44 heats the oxidation off-gas and generated water flowing in the rectangular pipe 40, and thus produces water vapor. For heating, the heater 44 uses a high temperature coolant (e.g., 120° C.), which is heated after having cooled the fuel cell 11 and is flowing in the rectangular pipe 43. The produced water vapor permeates the vapor permeable membrane 42, and then is mixed into the oxidation gas in the rectangular pipe 37, so as to humidify the oxidation gas.

A most portion of the coolant in-pipe 32a, which is provided from the pump 33 to the inlet 31a of the coolant jacket 31, is also a cylindrical pipe. A rectangular pipe 45 having a flat rectangular cylindrical shape is connected in series in a middle portion of the coolant in-pipe 32a, as shown in FIGS. 2 and 3. Both end openings of the rectangular pipe 45 are closed by the lid plates 38. The boss portions 39 are provided to the both lid plates 38 in order to connect the coolant in-pipe 32a. An upper surface of an upper plate 37c of the rectangular pipe 37 is in surface contact with a lower surface of a bottom plate 45a of the rectangular pipe 45.

In the present embodiment, a cooler 46 is provided by the surface contact portion of the rectangular pipe 37 and the rectangular pipe 45. The cooler 46 cools the oxidation gas and water vapor having a temperature of 40° C. to 50° C., for example, and flowing in the rectangular pipe 37, to an appropriate temperature (e.g., 20° C. to 30° C.), and thus appropriately maintains the temperature of the oxidation gas. For cooling, the cooler 46 uses a coolant, which has been cooled to a predetermined temperature (e.g., 20° C. to 30° C.) by the heat exchanger 34 and is flowing in the rectangular pipe 37.

Operations of the fuel cell system having the structure above are explained below. In FIG. 1, when a control signal from a controller (not shown in the figure) activates the fuel cell system, a hydrogen gas is supplied from the hydrogen gas cylinder 16 to the humidifier 18 through the fuel gas pipe 17. The hydrogen gas humidified by the humidifier 18 is then supplied to the fuel pole 12 side of the fuel cell 11. Meanwhile, air is supplied from the pump 24, which is included in the air supplier 23, to the oxidant pole 13 side of the fuel cell 11 through the oxidation gas pipe 25. Then, the power generation cells stacked in the fuel cell 11 generate power when the hydrogen gas reacts with an oxygen gas contained in the air. The generated electric power is converted from a direct current to an alternate current by an inverter (not shown in the figure), and then used for driving a driving motor of a vehicle and the like, for instance.

While the fuel cell 11 is generating power, fuel off-gases, including a nitrogen gas, a hydrogen gas, and the like, and percolating water are discharged to the fuel off-gas pipe 19 from the outlet 12b on the fuel pole 12 side of the fuel cell 11. Meanwhile, oxidation off-gases, including an oxygen gas, a nitrogen gas, and the like, and generated water are discharged to the oxidation off-gas pipe 26 from the outlet 13b on the oxidant pole 13 side. Then, a hydrogen separated by the hydrogen separator 20 is refluxed to the fuel gas pipe 17 through the hydrogen gas circulation pipe 21, and thereby used for power generation in the air supplier 23. The fuel off-gases and percolating water, from which most of the hydrogen gas has been separated by the hydrogen separator 20, are supplied to the hydrogen attenuator 27 through the oxidation off-gas pipe 26. In the hydrogen attenuator 27, the hydrogen gas and gases other than the hydrogen gas, including a nitrogen gas and the like, are mixed, and thus the hydrogen gas is attenuated and then discharged from the fuel off-gas pipe 19 to air.

Further, when the fuel cell 11 is generating power, a coolant in the coolant circulation pipe 32 is circulated and supplied by the pump 33 to the coolant jacket 31 of the fuel cell 11. Thereby, the power generation cells in the fuel cell 11 are cooled, and thus power is generated appropriately.

As described above, the oxidation off-gases, including a hydrogen gas, a nitrogen gas, and the like, and the generated water are supplied to the oxidation off-gas pipe 26 connected to the outlet 13b of the oxidant pole 13. Meanwhile, the coolant used to cool the fuel cell 11 is heated in the fuel cell 11, and is then discharged into the coolant out-pipe 32b and flows to the rectangular pipe 43. The generated water in the rectangular pipe 40 is heated by the heated coolant in the rectangular pipe 43, and thus water vapor is produced. The water vapor produced thereby permeates the vapor permeable membrane 42, and then flows into the rectangular pipe 37. Consequently, the oxidation gas in the rectangular pipe 37 is humidified by the water vapor, and the humidified oxidation gas is supplied to the oxidant pole 13.

The temperature of the coolant in the rectangular pipe 43 used to heat the generated water in the rectangular pipe 40 is lowered due to heat exchange at the heater 44. The temperature, however, is not lowered to a level appropriate as a coolant. The coolant discharged from the rectangular pipe 43 flows into the radiator 35 of the heat exchanger 34. The coolant is then cooled by the fan 36, and supplied by the pump 33 to the rectangular pipe 45 from the coolant in-pipe 32a. Thus, the oxidation gas and the water vapor in the rectangular pipe 37 of the oxidation gas pipe 25 is cooled by the coolant flowing in the rectangular pipe 45. Thereby, the oxidation gas and the water vapor are maintained at an appropriate temperature, and thus power generation efficiency of the fuel cell 11 is maintained appropriately.

The fuel cell system according to the embodiment above can provide effects below.

Figure 2:
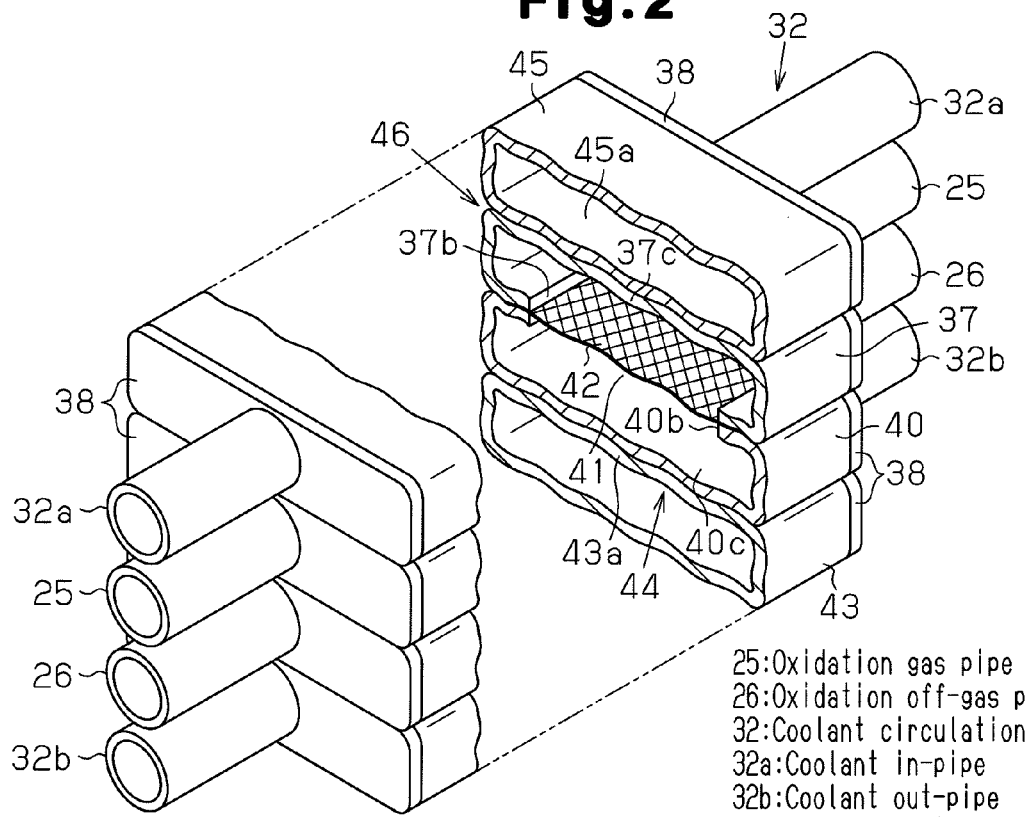
FIG. 2 is a perspective view illustrating a structure of a main portion of the fuel cell system.
Figure 3:
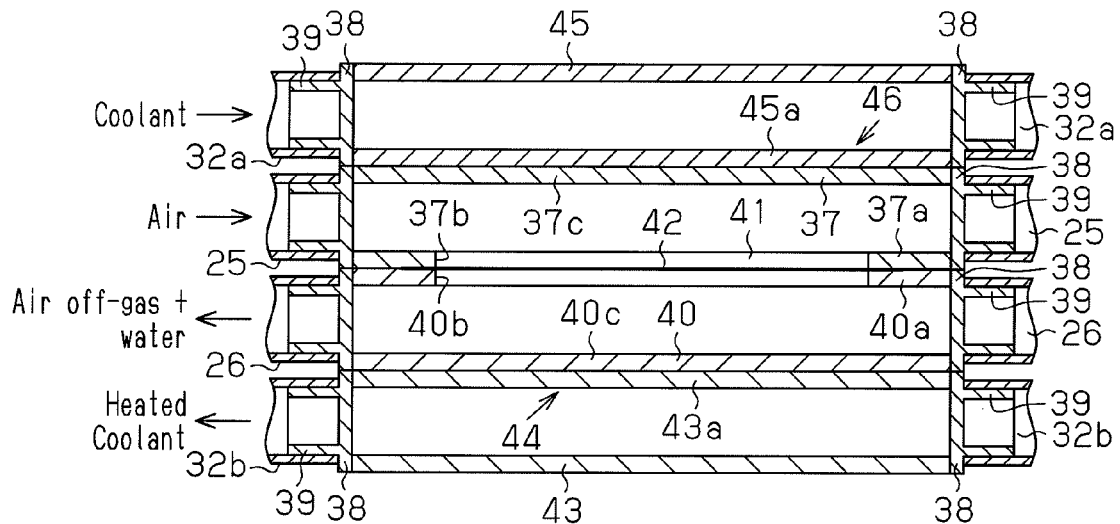
FIG. 3 is a longitudinal cross-sectional view illustrating the structure of the main portion of the fuel cell system.

(1) In the embodiment above, the rectangular pipes 37, 40, and 43 are connected to the oxidation gas pipe 25, the oxidation off-gas pipe 26, and the coolant out-pipe 32b, respectively; and are in surface contact with each other, as shown in FIG. 2. Further, the connecting path 41 is provided by the openings 37b and 40b to the surface contact portion of the rectangular pipes 37 and 40, and the vapor permeable membrane 42 is disposed at the connecting path 41. In addition, the heater 44 is provided by contacting the external periphery surfaces of the rectangular pipes 40 and 43. Thereby, the heated coolant discharged from the coolant jacket 31 of the fuel cell 11 to the coolant out-pipe 32b, heats the generated water in the rectangular pipe 40 and thus produces water vapor. The water vapor then permeates the vapor permeable membrane 42, so as to be directed inside the rectangular pipe 37. Thereby, the oxidation gas in the rectangular pipe 37 can appropriately be humidified. Further, an exclusive heater that humidifies the oxidation gas in the rectangular pipe 37 can be eliminated, and a unit-type humidifier having a complex structure can also be eliminated. Thus, the present embodiment can simplify the structure, reduce the number of parts, facilitate manufacturing and assembly operations, and reduce the facility cost.

(2) In the embodiment above, the upper surface of the rectangular pipe 43 is in surface contact with the lower surface of the rectangular pipe 40, and thereby a wide heat transfer area can be provided. The heat of the heated coolant in the rectangular pipe 43 can thus be transferred efficiently to the generated water in the rectangular pipe 40, and water vapor can be produced efficiently from the generated water. Thereby, humidifying efficiency can be improved.

(3) In the embodiment above, the lower surface of the rectangular pipe 45 is in surface contact with the upper surface of the rectangular pipe 37, and thereby the cooler 46 is provided. The oxidation gas and the water vapor in the rectangular pipe 37 can thus be cooled by the coolant to an appropriate temperature. Since the temperature of the oxidation gas supplied to the oxidant pole 13 of the fuel cell 11 is appropriately controlled, the power generation efficiency can be appropriately maintained.

Alternative embodiments of the present invention are sequentially explained with reference to FIGS. 4 and 5. In an embodiment shown in FIG. 4, a humidifying structure similar to the humidifying structure of the air supplier 23 shown in FIG. 2 is applied, instead of the humidifier 18 of the hydrogen gas supplier 15 shown in FIG. 1. Specifically, a rectangular pipe 37A, similar to the rectangular pipe 37, is connected in series in a middle portion of the fuel gas pipe 17. A rectangular pipe 40A, similar to the rectangular pipe 40, is connected in series in a middle portion of the fuel off-gas pipe 19 provided from the fuel cell 11 to the hydrogen separator 20. A heater 44A is provided by the rectangular pipe 40A and the rectangular pipe 43. A cooler 46A is provided by the rectangular pipe 37A and the rectangular pipe 45. Other components are same as those of the humidifying structure of the air supplier 23.

In the embodiment above, a heated coolant in the rectangular pipe 43 heats fuel off-gases and percolating water flowing from the fuel off-gas pipe 19 to the rectangular pipe 40A. The percolating water evaporates and permeates upward the vapor permeable membrane 42. The water vapor is then mixed with a fuel gas in the rectangular pipe 37A, and thereby the fuel gas is humidified. The fuel gas and the water vapor in the rectangular pipe 37A are cooled by the coolant in the rectangular pipe 45 to an appropriate temperature, and thus the power generation efficiency is appropriately maintained.

An exclusive heater that humidifies the fuel gas in the rectangular pipe 37A can also be eliminated from a fuel gas humidifying structure of the hydrogen gas supplier 15, similar to the oxygen gas humidifying structure of the air supplier 23; and a unit-type humidifier having a complex structure can be eliminated. Thus, the present embodiment can simplify the structure, reduce the number of parts, facilitate manufacturing and assembly operations, and reduce the facility cost.

An alternative embodiment shown in FIG. 5 is explained below. In the embodiment, a bypass pipe 32c is connected in parallel with the rectangular pipe 45; and an electromagnetic switching valve 51 is provided to a connecting portion with the coolant in-pipe 32a on an upstream side of the bypass pipe 32c. Check valves 52 and 53 are connected to the coolant in-pipe 32a and the bypass pipe 32c, respectively. A switching signal is output from a controller 55 to the electromagnetic switching valve 51, based on a detection signal from a temperature sensor 54 provided in the rectangular pipe 37 (or the rectangular pipe 37A). Other components are same as those in the previously described embodiments.

In the embodiment above, the temperature sensor 54 detects the temperature of the oxidation gas (fuel gas) and the water vapor in the rectangular pipe 37 (rectangular pipe 37A). When a detected temperature value exceeds a reference value (set temperature) stored in advance in a memory of the controller 55, the controller 55 outputs the switching signal, which activates the electromagnetic switching valve 51, such that a flow of the coolant is switched from the bypass pipe 32c to the rectangular pipe 45. When the temperature of the oxidation gas (fuel gas) and the water vapor in the rectangular pipe 37 (rectangular pipe 37A) is low, cooling is not performed. Thus, the oxidation gas (fuel gas) and water vapor having a more appropriate temperature can be supplied to the oxidant pole 13 (fuel pole 12) of the fuel cell 11.

The embodiments above may be modified as below. The surface contact portion of the rectangular pipe 40 (40A) and the rectangular pipe 43 may have a wave shape from a cross-sectional view, as shown in FIG. 6A. Heat dissipating fins 56 may be provided standing from a bottom plate of the rectangular pipe 40 (40A) at a plurality of positions, as shown in FIG. 6B. An opening 43b may be provided to an upper plate of the rectangular pipe 43, such that the heater 44 is formed by a bottom plate 40c of the rectangular pipe 40, as shown in FIG. 6B. In this case, the bottom plate 40c is a thin portion, which thus facilitates heat conductance and allows efficient heating of water in the rectangular pipe 40.

As shown in FIGS. 6C, 6D, and 6E, the cross-sectional shape of the rectangular pipe 37, the rectangular pipe 40, and the rectangular pipe 43 may be appropriately modified, such that the heat transfer area is widened. In each of the embodiments above, the heat transfer area for thermal energy is provided widely in the rectangular pipe 43, and thereby the generated water (percolating water) in the rectangular pipe 40 (40A) can efficiently be heated so as to produce water vapor.

Figure 4:
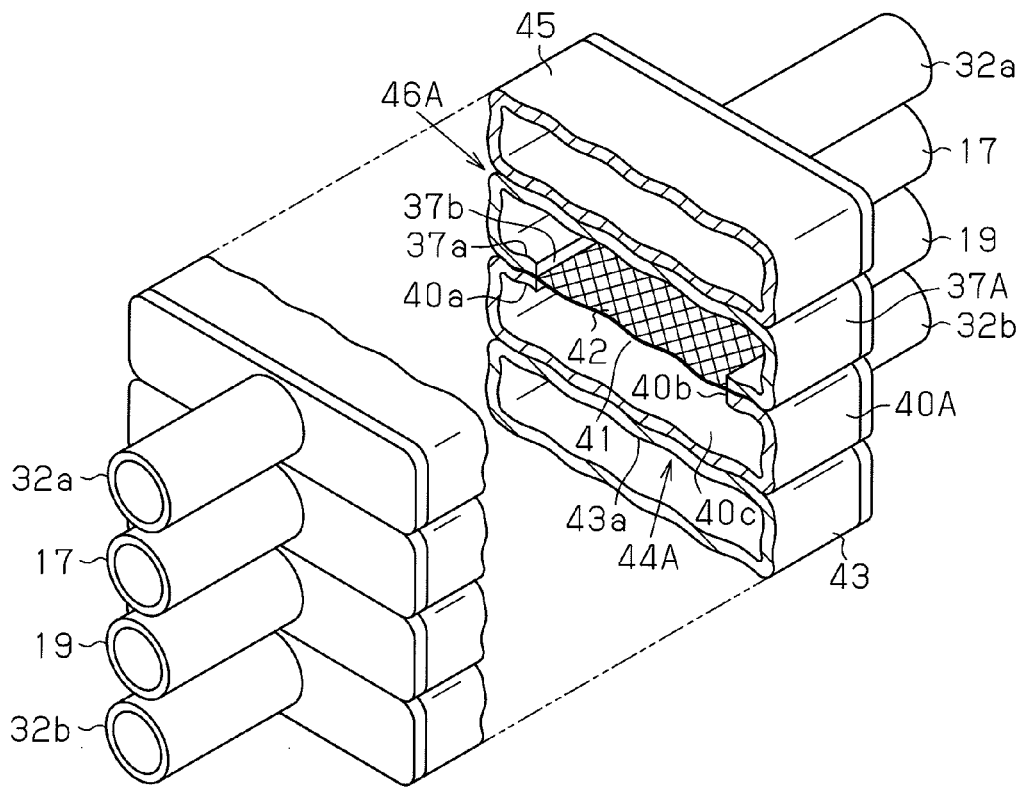
FIG. 4 is a perspective view illustrating a structure of a main portion of a fuel cell system according to an alternative embodiment of the present invention.
Figure 7:
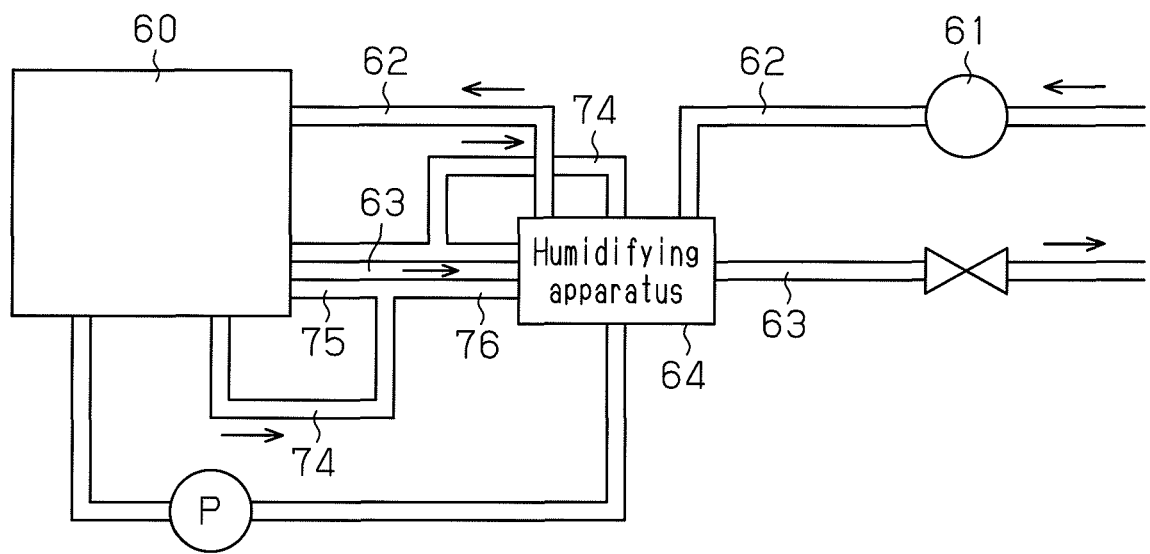
FIG. 7 is a schematic circuit diagram of a conventional fuel cell system.

The humidifying structure shown in FIG. 4 may be applied only to the hydrogen gas supplier 15 of the fuel cell system.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A fuel cell system comprising:
 a fuel cell having a fuel pole and an oxidant pole;
 a fuel gas pipe configured to supply a fuel gas and connected to an inlet of the fuel pole;
 a fuel off-gas pipe connected to an outlet of the fuel pole;
 an oxidation gas pipe configured to supply an oxidation gas and connected to an inlet of the oxidant pole;

an oxidation off-gas pipe connected to an outlet of the oxidant pole;

a coolant circulation pipe configured to circulate a coolant and connected to an inlet and an outlet of a cooling jacket in the fuel cell; and a heat exchanger configured to cool the coolant heated in the fuel cell and provided to the coolant circulation pipe, wherein opposing openings are provided to respective pipe walls of the oxidation gas pipe and the oxidation off-gas pipe, a connecting hole is formed by the openings, a vapor permeable membrane is disposed at the connecting hole, an external periphery surface of a coolant out-pipe provided from the outlet of the cooling jacket to the heat exchanger is provided in surface contact with an external periphery surface of the oxidation off-gas pipe such that a heater is provided in which heat from heated coolant flowing through the coolant out-pipe heats water flowing through the oxidation off-gas pipe to produce water vapor, and the pipe wall of the oxidation gas pipe corresponding to the vapor permeable membrane is provided in surface contact with a pipe wall of a coolant in-pipe provided from the heat exchanger to the inlet of the cooling jacket, such that a cooler is provided in which an oxidation gas in the oxidation gas pipe is cooled.

2. The fuel cell system according to claim 1, wherein a coolant bypass pipe is provided in parallel with the coolant in-pipe, such that the cooler is circumvented;

a switching valve for a coolant flow is provided to a connecting portion of an upstream portion of the coolant bypass pipe and the coolant in-pipe;

a temperature sensor is provided to measure an internal temperature of the oxidation gas pipe; and when a value measured by the temperature sensor exceeds a reference value, a switching signal is output from a controller to the switching valve, such that the coolant flow is switched from the bypass pipe to the coolant in-pipe of the cooler.

3. The fuel cell system according to claim 1, wherein a surface contact portion of the pipes has a serpentine shape.

4. The fuel cell system according to claim 1, wherein a surface contact portion of the pipes is provided with a thin portion configured to facilitate heat conductance.

* * * * *